UNITED STATES PATENT OFFICE.

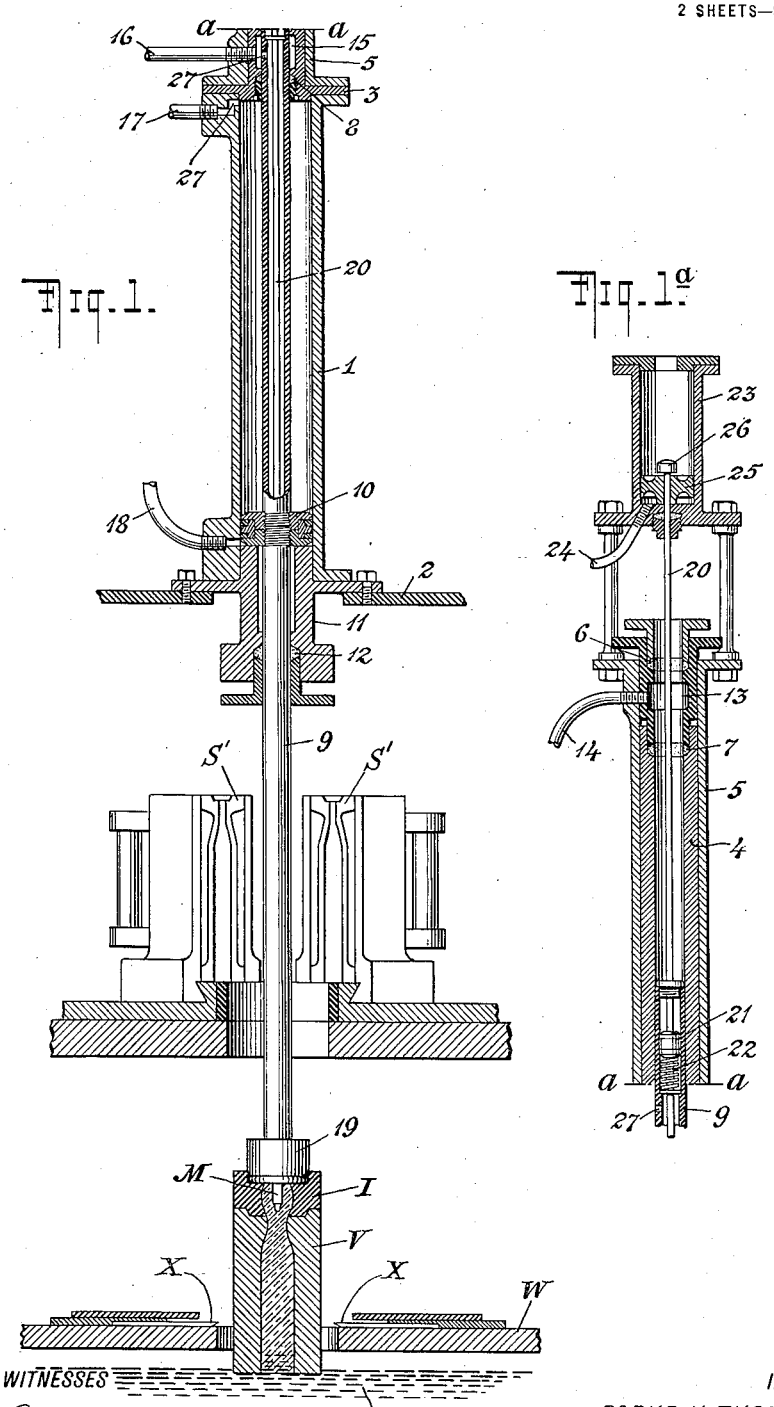

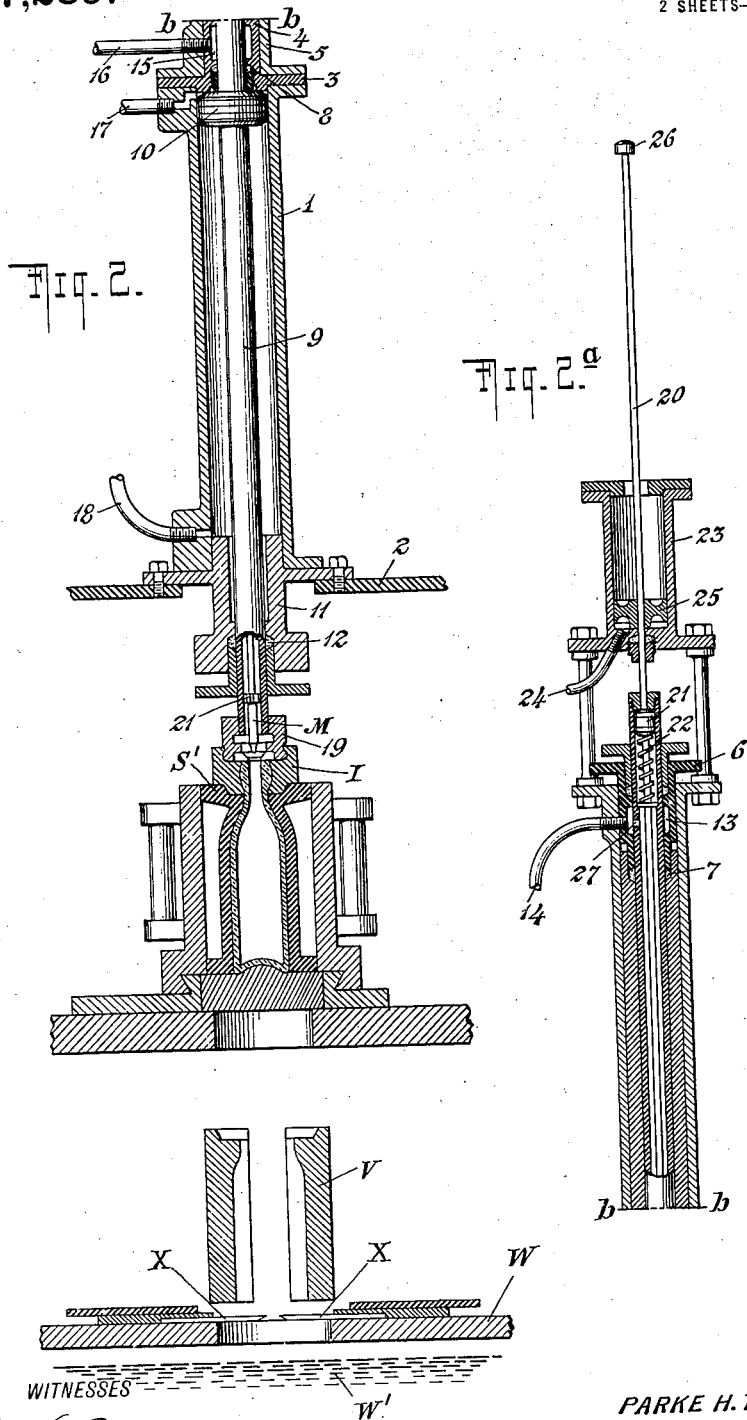

PARKE H. THOMPSON, OF MILLVILLE, NEW JERSEY, ASSIGNOR TO MILLVILLE MACHINE COMPANY, OF MILLVILLE, NEW JERSEY, A CORPORATION OF NEW JERSEY.

APPARATUS FOR THE MANUFACTURE OF HOLLOW GLASSWARE.

1,177,289.   Specification of Letters Patent.   Patented Mar. 28, 1916.

Application filed February 16, 1915. Serial No. 8,447.

*To all whom it may concern:*

Be it known that I, PARKE H. THOMPSON, a citizen of the United States, residing at Millville, Cumberland county, New Jersey, have invented certain new and useful Improvements in Apparatus for the Manufacture of Hollow Glassware, of which the following is a specification.

My invention relates to apparatus for the manufacture of hollow glassware such as bottles and the like, and particularly to the type of apparatus in which such glassware is made by the aid of suitably manipulated air under pressure or exhaustion or both; the glass being first forced into a blank mold at one level so as to form a parison and then raised to a higher level where it is expanded in a finishing mold to final shape. In such apparatus a plunger arranged to produce an indentation in the top of the parison insures access of air to the interior of the glass and thus permits and facilitates its final expansion.

The object of my invention is to provide apparatus as aforesaid which shall be more certain, efficient, and speedy in operation than apparatus hitherto used.

More particularly the object of my invention is to provide improved means for positioning and removing the plunger from the top of the parison, and for applying differences of air pressure in expanding the glass into its final form.

My invention will be better understood by referring to the accompanying drawings in which it is shown embodied in, or as modifying, a machine of the above described type as illustrated in patent to Charles F. Cox, No. 880,482, dated February 25, 1908.

In the drawings Figures 1 and 1ª, taken as one, is a sectional elevation, similar to Fig. 1 of the Cox patent referred to, showing my improvement, and Figs. 2 and 2ª, taken as one, is a sectional elevation similar to Fig. 2 of the Cox patent.

In these views parts of the mechanism depicted are identical with those shown in the same figures of the Cox patent. Except for the particular parts embodying my improvements, as set forth below, the remaining parts of a complete machine may be (although not necessarily so) the same as those of the Cox patent as described and as illustrated in the various views therein.

In the following description Fig. 1ª should be considered as placed upon Fig. 1 so that the lines *a—a* coincide and similarly Fig. 2ª should be placed upon Fig. 2 with the lines *b—b* coincident, the excessive height of the mechanism making it necessary to thus break the drawing in order to make a showing on an adequate scale.

Briefly, in making the embodiment of my invention about to be described, I replace the cylinder A of the Cox machine, with its piston F and attached hollow piston rod G, the second piston J and piston rod K with its valve cage L, valve N, and the other immediately associated packing glands, air chambers, air passages, etc., by a cylinder having pistons, piston rods, air chambers, air passages, and associated parts having somewhat similar forms and functions but differently arranged so as to operate differently and bring about improved results.

In the description which follows, identical letters are used to designate parts which correspond to and are (although not necessarily so) identical with parts shown in the Cox patent.

In the drawings, a piston cylinder 1 is mounted upon a table 2, above and in alinement with blank mold V and finishing mold S'. The upper end of the cylinder is closed by a flanged cap 3 having a central upwardly projecting extension 4 which is bored centrally so as to serve as an inner sleeve for a second cylinder 5 which is supported upon the cylinder 1. The sleeve 4 extends nearly to the top of cylinder 5 which is closed by a plug 6 arranged to coöperate with the top of the sleeve so as to provide a packing gland 7. A similar packing gland 8 is provided near the bottom of cap 3.

Within the two cylinders 1 and 5, and a little longer than their combined lengths, is a hollow piston rod 9; its diameter is such that it has easy sliding fit in the bore of cap 3, extension 4, and plug 6 with which the upper cylinder 5 is lined. Fitted in the lower cylinder 1 is a main piston 10, fixed upon the hollow piston rod 9, and adapted to move from one end of said cylinder to the other. The lower end of cylinder 1 is closed by a plug 11 through the central bore of which the piston rod 9 is adapted to be moved. A packing gland is provided at 12. An annular air chamber 13 and connecting pipe 14 (provided with a reducing valve, not shown) is arranged at the top of cylinder 5 and a similar chamber 15 and pipe 16 at the bottom; pipe 16 goes to an independent vacuum tank not found in the Cox patent. Air pipes 17 and 18 open into the top and bottom, respectively, of piston cylinder 1 and correspond to inlets E and D, respectively, of Cox.

A head 19, which may be though it need not be identical with the head H of the Cox patent, is bolted, or otherwise firmly held, to the lower end of piston rod 9; the air valve H' of Cox is, however, unnecessary. Inclosed within hollow piston rod 9 is a second piston rod 20 tipped at its bottom by a plunger M; a star shaped spider, or guide 21 keeps the plunger centered. The spider or guide may have any convenient shape provided only it leaves substantial passageway for air between the two piston rods, 20 and 9.

When the machine, in which my invention is embodied, is in idle position (Fig. 2) the plunger M lies entirely within the hollow piston rod 9 and just above its lower end, as shown. The length of rod 20 is such that a very considerable portion will, in these circumstances, project out above the top of the hollow piston rod. A piston 21 is fixed upon rod 20 and a spring 22 holds the same normally against the cap which closes the top of hollow piston rod 9.

Mounted upon and above the two cylinders 1 and 5 and in alinement therewith is a short plunger cylinder 23 through the bottom of which enters a pipe 24 for the supply of compressed air; the top of this cylinder is left open to the atmosphere and the rod 20, carrying a piston 25 slidably thereon, normally passes through and beyond it. The extreme upper end of rod 20 is tipped by a flanged button 26. Circumferentially disposed holes 27 through the wall of the hollow piston rod are in registry with annular air chamber 13 when piston 10 is in its limiting upper position.

The operation of my invention is as follows: Air under pressure being admitted to pipe 17, main piston 10 is forced down to the bottom of cylinder 1, thus putting the parts in the position shown in Figs. 1 and 1ª. Holes 27 will now register with annular chamber 15 and, the bottom of piston rod 9 being closed through the blank mold V which is now inserted in the molten glass W', the interior of the hollow piston will be exhausted by applying suction to pipe 16, thereby drawing down piston 21 against the resistance of spring 22 and forcing plunger M down into neck mold I; glass will then be drawn up into the blank mold and neck mold and around the plunger.

By means fully disclosed in the Cox patent (or by other equivalent means) but not constituting a part of my invention nor shown in the drawings herewith, the blank mold is now raised through a short distance, the excess glass removed from the bottom of the mold, and the blank mold opened. Air is then admitted to pipe 24 thus raising piston 25 and, since button 26 lies against the top of said piston, also raising and withdrawing the plunger M from the glass blank. The air pressure is then cut off from pipe 17 and admitted to pipe 18 below main piston 10 thus raising the hollow piston rod 9 and bringing all the parts in the position shown in Figs. 2 and 2ª. (Finishing mold S' with its bottom U may be closed about the neck mold I and the glass blank by means similar to those of the Cox patent). This raising of rod 9 will again bring holes 27 into registry with the upper air chamber 13 and compressed air is now admitted through pipe 14 and will pass into the interior of said hollow rod and through the opening left by the plunger M in the neck of the parison and will expand said parison against the bottom and the walls of the finishing mold and thereby shape the finished article. The finishing mold may now be opened and the said article removed.

In the Cox patent referred to the final expansion of the bottle in the finishing mold was accomplished by applying suction on the outer side of said bottle and depending upon leakage to supply the necessary co-operating air for the inside of the bottle. The amount of this leakage was found to be irregular and variable at different times so that the results produced were not satisfactory. In my improved arrangement as above described the blank is expanded into the finishing mold by a positive pressure of compressed air admitted to the interior of the blank and the amount of pressure is of course, under perfect control. The plunger is drawn down into the neck of the blank mold by the same suction and part of the same operation which draws the charge of glass into said mold. By my improvement the valve cage on the lower end of piston rod K of the Cox patent has been eliminated.

I claim:

1. In apparatus of the class described, a hollow piston rod having an opening in the wall thereof, a piston fixed to said hollow rod, a cylinder for said piston having openings for admitting air above and below said piston, a rod extending through said hollow piston rod, a plunger at the lower end of said last named rod, a piston on said last named rod within said hollow piston rod and means for applying either pressure or exhaust to the outer end of the opening in the hollow piston rod.

2. In apparatus of the class described, a piston cylinder having openings at top and bottom for the admission of air, a piston adapted to be moved from one end to the other of said cylinder, a hollow piston rod to which said piston is attached, the lower end of said piston rod being adapted to carry a neck mold and the upper end extending beyond the piston, a second cylinder mounted upon the piston cylinder and having an air chamber at the top and a vacuum chamber at the bottom thereof, an opening through the wall of said hollow piston adapted to register with the air chamber or with the vacuum chamber according as the piston is at the top or at the bottom of its stroke, a piston rod within said hollow rod, a plunger at the bottom of said piston rod and a piston upon the upper part of said rod just within the end of the hollow piston.

3. In apparatus of the class described, a piston cylinder having openings at top and bottom for the admission of air, a piston adapted to be moved from one end to the other of said cylinder, a hollow piston rod to which said piston is attached, the lower end of said piston rod being adapted to carry a neck mold and the upper end extending beyond the piston, a second cylinder mounted upon the piston cylinder and having an air chamber at the top and a vacuum chamber at the bottom thereof, an opening through the wall of said hollow piston adapted to register with the air chamber or with the vacuum chamber according as the piston is at the top or at the bottom of its stroke, a piston rod within said hollow rod, a plunger at the bottom of said piston rod, and means for applying force to the top of said last named piston for raising said plunger.

In testimony whereof, I have hereunto set my hand in the presence of two subscribing witnesses.

PARKE H. THOMPSON.

Witnesses:
 THOMAS WHITAKER,
 MARY M. TULLER.